United States Patent [19]
Yogev et al.

[11] Patent Number: 5,578,140
[45] Date of Patent: Nov. 26, 1996

[54] SOLAR ENERGY PLANT

[75] Inventors: Amnon Yogev, Rehovot; Vladimir Krupkin; Michael Epstein, both of Rishon LeZion, all of Israel

[73] Assignee: Yeda Research and Development Co., Ltd., Rehovot, Israel

[21] Appl. No.: 384,338

[22] Filed: Feb. 1, 1995

[30] Foreign Application Priority Data

Feb. 1, 1994 [IL] Israel ........................................ 108506

[51] Int. Cl.⁶ ...................... H01L 31/052; H01L 31/058; F24J 2/00
[52] U.S. Cl. ........................ 136/246; 60/641.5; 126/685; 126/686; 126/600; 126/572; 136/248; 422/186
[58] Field of Search ..................... 136/246, 248; 126/685–686, 600, 572; 422/186; 60/641.15

[56] References Cited

U.S. PATENT DOCUMENTS

| | | | |
|---|---|---|---|
| 3,645,601 | 2/1972 | Doctoroff et al. | 359/360 |
| 3,972,183 | 8/1976 | Chubb | 60/641.8 |
| 4,025,783 | 5/1977 | Fletcher et al. | 359/193 |
| 4,154,219 | 5/1979 | Gupta et al. | 126/575 |
| 4,158,356 | 6/1979 | Wininger | 126/579 |
| 4,273,103 | 6/1981 | Uroshevich | 126/658 |
| 4,281,294 | 7/1981 | Volkin | 372/79 |
| 4,395,582 | 7/1983 | Damsker | 136/248 |
| 4,536,847 | 8/1985 | Erickson et al. | 364/516 |
| 4,553,531 | 11/1985 | Rosende | 126/600 |
| 4,784,700 | 11/1988 | Stern et al. | 136/248 |
| 5,005,958 | 4/1991 | Winston et al. | 359/727 |
| 5,294,075 | 5/1994 | Vertatschitsch et al. | 244/75 R |
| 5,374,317 | 12/1994 | Lamb et al. | 136/246 |

OTHER PUBLICATIONS

"Technical Note", Solar Energy, vol. 18, pp. 269–271, Pergamon Press 1976.

"Approaching the Irradiance of the Surface of the Sun", Solar Thermal Technology: Research Development and Applications, R. Winston, P. Gleckman and J. J. O'Gallagher, pp. 579–586, 1990.

"Solar Thermal Central Receiver Systems", vol. 1, Design, Construction and Operation of CRS–Plants, pp. 187–197, 1986 (Springer–Verlag, Berlin).

"Beam Quality and Tracking Accuracy Results of the Weizmann Institute of Science Heliostats", Solar Thermal Technology: Research Developments and Applications, M. Epstein, pp. 109–111, 1990.

*Primary Examiner*—Aaron Weisstuch
*Attorney, Agent, or Firm*—Wigman, Cohen, Leitner & Myers

[57] ABSTRACT

The disclosure concerns various improvements in a solar energy plant of the kind in which incoming solar radiation is concentrated by a Fresnel reflector, i.e. a field of concentrating mirrors, and the concentrated radiation is focused into a solar receiver. By one improvement a dielectric mirror is provided at a suitable level above the solar collector, to reflect the concentrated solar radiation into the collector. By another disclosed improvement a plurality of non-imaging secondary concentrators arranged in concentric zones is provided intermediary between the dielectric mirror and receiver. By yet another improvement the solar receiver is directly attached to a heat storage system.

52 Claims, 3 Drawing Sheets

SOLAR ENERGY PLANT

FIELD OF THE INVENTION

The invention relates to a solar energy plant of the kind comprising a solar radiation concentrator in association with a high-power solar energy receiver.

BACKGROUND OF THE INVENTION

Solar energy technology aims at providing economically competitive and environmentally friendly power for a variety of commercial applications. The efficiency of the conversion of solar energy into utilizable heat or electric power depends to a great extent on the light brightness achieved on the entrance surface of a solar energy receiver as well as on reflection, shadow and other losses, and is dependent on the available solar energy concentration.

Phase-space conversion and thermodynamic considerations place a theoretical limit on the concentration of sunlight that ally optical device can achieve (R. Winston et al. Approaching the irradiance of the surface of the sun, *Solar Thermal Technology*, Proc. 4th Intern. Symposium, Santa Fe, N.M., pp. 579–587, 1988). This limitation is expressed by the equation $$C_{max} = \frac{n^2}{\sin^2\alpha} \quad (1)$$

where $C_{max}$ is the maximum attainable concentration, n is the refractive index of a target surface and $\alpha$ is the half-angle of incidence, of the sunlight. This theoretical limit is derived under the assumption that the target area is large enough to collect all of the concentrated light.

The concentrations attainable in practice by conventional imaging devices fall far short of this limit owing to aberrations. For example, a parabolic mirror produces a perfect image on axis but the image blurs and broadens off axis.

By dispensing with image-forming requirements ill applications where no image is required, much higher concentration can be achieved. Non-imaging optics is known to allow light concentration close to the thermodynamic limit and, therefore, this technology is frequently used in powerful concentrators.

A practical approach for high concentrations of sunlight usually utilizes a two-stage optical system that incorporates a first-stage (primary) imaging concentrator which redirects incident solar radiation towards the focal point, and a second-stage (secondary) non-imaging concentrator which directs the concentrated solar radiation onto the solar absorber of a solar receiver. The secondary concentrator is placed close to the focus of the primary one and provides acceptance of all redirected solar energy as well as high brightness at the entrance of the receiver. The overall concentration for a two-stage system is a product of the concentration of the primary concentrator with that of the non-imaging concentrator:

$$C = C_p \frac{n^2 \sin^2\beta}{\sin^2\alpha} \quad (2)$$

where C is an achievable concentration factor, $C_p$ is a concentration factor of a primary concentrator and $\alpha$ and $\beta$ are the maximum angles of distribution of the incoming and outgoing light.

The size and overall performance of the system are greatly affected by the nature of the primary concentrator. This imaging, first-stage concentrator may often be in a form of a parabolic or spherical mirror. The concentration provided by a parabolic dish may be calculated as follows:

$$C_p = \frac{r^2 \sin(\tan^{-1}(h/r))}{h^2 \sin^2(\alpha)} \quad (3)$$

where $C_p$ is the concentration factor for a parabolic dish, $\alpha$ is the maximum angle of distribution of incoming light, r is the radius of the parabolic dish and h is the so-called focal distance, i.e. the distance from the dish to the focal plane. The concentration usually achieved by a parabolic dish is less than 25% of a thermodynamic limit.

In an effort to concentrate the incoming solar radiation close to the thermodynamic limit, attempts have been made to use an imaging reflective telescope, e.g. a Cassegrain telescope, as a primary concentrator (W. Zittel, "Design Studies for Solar Pumped Lasers", DFVLR-FB 87-39, Stuttgart, 1987). However, such a telescope formed by a parabolic primary mirror and a hyperbolic secondary mirror has very low aberrations only for a very narrow acceptance angle. Therefore, to provide a high-power concentration, the telescope has to track the sun, which is practically impossible for this kind of system where the size of a primary reflective area may be of the order of tens or even hundreds of thousands of square meters.

For stationary receivers, the Fresnel reflector is often a primary concentrator of choice because of its construction and tracking simplicity (M. Epstein, "Central receiver facility at the Weizmann Institute of Science", *Solar thermal central receiver systems*, Proc. III Intern. Workshop, Springer-Verlag, Berlin, FRG, pp. 187–197, 21986. M. Epstein, "Beam quality and tracking accuracy results of the Weizmann Institute of Science Heliostats", *Proc. 4th. Intern. Symp. on Research, Development and Applications of Solar Thermal Technology*, New York, pp. 108–111, 1990).

There are different types of Fresnel reflectors. Two-dimensional (2-D) Fresnel reflectors with focal lines have been developed for use in commercial plants; three-dimensional (3-D) Fresnel reflectors with focal points, usually called heliostats field, arc used in conjunction with central solar receivers and solar towers, particularly in the megawatts scale systems, as they can operate at higher power fluxes and temperatures, thus allowing to achieve high conversion efficiencies. The heliostats field consists of a plurality of computer controlled mirrors which redirect solar radiation towards a secondary concentrator located in the region of the focal points usually located on a central solar tower, and followed by a volumetric central receiver. The concentration factor of the heliostats field may be calculated by the equation $$C_f = C_p \cdot \frac{2\pi \int_r r\sin(\tan^{-1}(h/r))dr}{\pi \cdot r_2} \quad (4)$$

where $C_f$ is the concentration factor of the heliostats field, $C_p$ is the concentration factor of an individual constituent parabolic or spherical mirror of the field, h is the focal length of the heliostats field and r is the field radius. Because of shadowing effects, even when the sun remains in zenith, and because the area of the redirected solar radiation is smaller than the reflective area of the heliostats, and the aggregate area of the heliostats is smaller than the gross area of the heliostats field, the available concentration of the heliostats field is less than that of a parabolic dish, and usually does not exceed 21%. It is clear from the above equations that the larger the focal distance of the concentrator or the larger the h/r ratio, the higher the concentration achievable. Thus, for better overall concentration the focal length of the heliostats field, which actually determines the height of the solar tower, should be as large as possible.

In a 100 MW scale solar system the height of a solar tower has to be 100 meters and more. Therefore, the secondary concentrator and the associated central solar receiver as well as some components of the energy conversion systems must all be installed at the top of the tower. This requirement poses difficult and expensive engineering problems which are aggravated by shadowing problems arising out of the fact that the solar light reaches the secondary concentrator from below. The focal distances of heliostats often exceed 300 meters for a solar field with a high solar tower which leads to significant aberrations and loss of concentration (L. L. Vant-Hull, M. E. Izogon and C. L. Pitman, "Results of a heliostat field: receiver analysis for Solar Two", *Proceedings of the ACME International Solar Energy Conference,* Washington, D.C. pp. 2243–2251, May 1993).

To sum up, high power solar energy plants with a heliostats field concentration system and a central solar receiver on top of a high tower, optionally in association with a secondary concentrator, poses serious problems of design and efficacy of primary concentration.

These problems have already been acknowledged in the past and in the attempt to solve them a so-called "tower reflector" concept has been proposed (A. Rabl, "Technical Note. Tower reflector for solar power plant", *Solar Energy,* Vol. 18, pp. 269–271, 1976). In accordance with this concept, a solar energy plant comprising a solar receiver and a heliostats field installed on a base plane and having a focal point above said base plane is provided with an additional, flat Fresnel reflector mounted on a solar tower close to the focal point, whereby concentrated solar radiation reflected by the additional reflector is redirected onto the solar receiver placed close to the base plane. To improve the radiation concentration achieved by the system, a compound parabolic concentrator placed in the vicinity of the receiver is employed. Thus, due to the use of the tower reflector, the solar receiver and any associated equipment can be installed close to the base plane rather than being mounted on top of a high tower.

However, as acknowledged in Rabl's disclosure, there exists a serious problem connected with a necessity to avoid overheating of the tower reflector which is to be exposed to the concentrated solar light of 100 suns or even more. With an ordinary construction of the reflector, based on metallic layers, a significant amount of this energy would have been absorbed by the reflector requiring an intensive cooling thereof, which is quite difficult and onerous at high altitudes of the tower. In order to solve the overheating problem, Rabl suggests that the elements of the tower Fresnel reflector be in the form of rectangular prisms with total internal reflection. In such a design the tower reflector of the solar energy plant has to be of relatively large dimensions anti have an extremely large mass. Moreover, with the tower reflector in the form of the flat Fresnel reflector, shadowing and blocking effects will take place causing deterioration of primary concentration, losses of solar radiation and, consequently, a rather low conversion efficiency of the solar plant. Finally, the costs of such an arrangement would be prohibitive. All these disadvantages render the construction proposed by Rabl practically inapplicable anti may explain why, until now, the tower reflector concept has not found its use.

It is the object of the present invention to provide a highly efficient solar energy plant with a tower reflector in which the above disadvantages are avoided.

SUMMARY OF THE INVENTION

In the description of the present invention and claims the term "dielectric mirror" means a composite body comprising a transparent substrate coated with a plurality of relatively thin layers made of dielectric materials transparent for at least a part of the spectrum, which mirror, when illuminated by radiation of a limited spectral distribution, provides for an integral reflection effect. Generally, the dielectric mirror operates as a beam splitter transmitting substantially all non-reflected radiation. A desired amount of the reflected radiation Call be achieved by a proper choice of indices of refraction of the materials, thicknesses, number and sequence of the layers. To improve the beam-splitting, a distribution of angles of incidence of the radiation has to be substantially limited.

In accordance with one aspect of the present invention there is provided a solar energy plant for the conversion of solar radiation into utilizable energy of the kind that comprises a Fresnel reflector consisting of a plurality of concentrating mirrors installed on a base plane and having a focal point above said base plane removed from the Fresnel reflector by a focal length, at least one solar receiver placed close to said base plane and an additional reflector mounted above said Fresnel reflector close to said focal point whereby concentrated solar radiation reflected by the Fresnel reflector is redirected onto said at least one solar receiver, characterized in that said additional reflector is in the form of a dielectric mirror, whereby overheating thereof is avoided.

The beam-splitting ability of the dielectric mirror makes its absorption coefficient negligible and, consequently, a necessity of cooling arrangements is eliminated. As mentioned above, to enable the use of the dielectric mirror, a spectral distribution of the radiation has to be limited. With the solar energy plant, according to the present invention, this requirement is satisfied due to the fact that the concentrating mirrors of the Fresnel reflector, usually used in solar energy plants of the kind to which the present invention refers, arc silver reflectors which cut off a significant short-wavelength portion of the solar radiation.

If desired, the dielectric mirror may be designed to provide a very high, substantially total reflection of radiation, which is actually a particular case of the beam-splitting with all the losses being transmission losses. Alternatively, the dielectric mirror may be provided with a metallic back coating. In this case layers of the dielectric mirror are designed to provide reflection of most of the radiation which would be absorbed by the metallic coating.

In the preferred embodiment of the present invention, the dielectric mirror is a curved mirror in which each sector is exposed to a limited range of angles. Thus, the limited distribution of angles of incidence of the radiation is provided, whereby the efficiency of the mirror is increased. Preferably, the mirror is a convex mirror mounted in front of the focal point. It may, however, be concave so as to be mounted behind the focal point.

The use of additional reflector in the form of the dielectric mirror allows for its design according to specific needs. Thus, the reflector may have a color or color range selective, e.g. bandpass, coating.

The additional reflector may be made in one piece or be segmented. It may also be of the Fresnel type.

In the preferred embodiment of the present invention, the Fresnel reflector of the solar energy plant is of the heliostats field type in which at least some of said concentrating mirrors tracks the sun.

If desired, the plant according to the invention may comprise a secondary concentrator placed between said additional reflector and said at least one solar receiver.

Preferably, the secondary concentrator is of a non-imaging type, e.g. a compound parabolic concentrator (CPC) or a tailored edge-ray concentrator (TERC) such as disclosed, for example, in H. Reis and R. Winston, "Tailored edge-ray reflectors for illumination", *J. Opt. Soc. Am.*, May 1993; J. M. Gordon and H. Reis, "Tailored Edge Ray Concentrators as ideal stages for Fresnel reflectors", *Applied Optics*, Vol. 32, No. 13, pp. 2243–2251, May 1993; H. Reis and R. Winston, "Tailored edge-ray reflectors for illumination", *J. Opt. Soc. Am.*, May 1993, J. M. Gordon and H. Reis, "Tailored Edge Ray Concentrators as ideal stages for Fresnel reflectors", *Applied Optics*, Vol. 32, No. 13, pp. 2243–2251, May 1993. Alternatively, the secondary concentrator may be of an imaging type.

Preferably, the base plane on which the heliostats field is located is inclined relative to the horizontal whereby the angle that the incident solar radiation forms with a normal to the base plane is reduced.

If desired, the receiver may be distanced from the Fresnel reflector and the additional reflector in this case should be tilted to redirect radiation onto the receiver.

If desired, said at least one solar receiver in a plant according to the invention may be associated with a heat engine and an electric generator whereby the plant becomes a solar power station. In cases where energy storage is required, the receiver, according to the present invention may be associated with a suitable storage system, e.g. a heat storage tank. If desired, the solar receiver may be in form of a heat storage tank. Thus, the need for expensive and energy consuming communication systems which would be required if the central solar receiver were mounted on the tower, is eliminated.

Alternatively, said at least one solar receiver may be associated with means for the withdrawal of utilizable heat; or be designed as a chemical reactor, as a photovoltaic system, as a concentrated solar radiation pumped laser device, etc.

In a preferred embodiment of the invention the ratio between the distance of the additional reflector from said focal point and the focal lengths of the heliostats field is within the range of from about 1:5 to about 1:10.

It is further preferred that the ratio between the diameters of the additional reflector and the heliostats field is about 1:10.

More than one receiver may be used in a plant according to the invention. For example an additional solar receiver may be placed behind said additional reflector in the focal point region of said heliostats field.

If desired, a plant according to the present invention may comprise at least one supplementary reflector placed between said additional reflector and at least one of said solar receivers. The supplementary reflector may be of the beam splitter type, or fabricated so as to be color selective. The supplementary color selective reflector may provide different bandpasses for different solar receivers.

It can, therefore, be concluded that due to the fact that the additional reflector, according to the present invention, is in the form of a multilayered structure, it may have a large variety of features allowing for conversion of practically most of the solar radiation incident on the reflector into utilizable energy and thereby increasing efficiency of the solar energy plant.

According to another aspect of the present invention, there is provided a solar energy plant for conversion of solar radiation of the kind that comprises a working fluid for the withdrawal of absorbed heat, comprising a Fresnel reflector consisting of a plurality of concentrating mirrors installed on a base plane and having a focal point above said base plane removed from the Fresnel reflector by a focal length, at least one solar receiver assembly placed close to said base plane and holding said working fluid and an additional reflector mounted above said Fresnel reflector close to said focal point whereby concentrated solar radiation reflected by the Fresnel reflector is redirected onto said at least one solar receiver assembly, characterized in that the plant comprises intermediary between said additional reflector and said at least one solar receiver, a plurality of non-imaging secondary concentrators arranged in concentric zones, each secondary concentrator associated with a dedicated aperture in said receiver assembly, whereby concentric zone of different temperature are formed inside the receiver and the working fluid is gradually heated when passing from the outermost zone with the lowest temperature to the innermost zone with the highest temperature.

By one embodiment, the receiver assembly comprises a plurality of receiver units each having one aperture.

By another embodiment the receiver assembly comprises one single receiver unit with a plurality of apertures.

According to a still further aspect of the present invention, there is provided a solar energy plant comprising a Fresnel reflector in the form of a heliostats field installed on a base plane and having a focal point above said base plane removed from the Fresnel reflector by a focal length, at least one solar receiver placed close to said base plant and an additional reflector mounted on a tower close to said focal point whereby concentrated solar radiation reflected by the Fresnel reflector is redirected onto said at least one solar receiver, characterized in that the plant comprises means for monitoring a displacement of said additional reflector, which monitoring means may be in the form of laser scanning device or TV imaging system, and means for dynamic adjustment of the heliostats so as to track the displacement of the reflector whereby any impairment of the performance of the plant in consequence of reflector displacement is avoided.

According to still further aspect of the present invention, there is provided a solar energy plant for conversion of solar radiation into heat, comprising a Fresnel reflector consisting of a plurality of concentrating mirrors installed on a base plane anti having a focal point above said base plane removed from the Fresnel reflector by a focal length, at least one solar receiver placed close to said base plane and an additional reflector mounted above said Fresnel reflector close to said focal point whereby concentrated solar radiation reflected by the Fresnel reflector is redirected onto said at least one solar receiver, characterized in that said receiver is attached directly to a heat storage system.

DESCRIPTION OF THE DRAWINGS

For better understanding the present invention will now be described, by way of example only, with reference to the accompanying drawings in which.

DETAILED DESCRIPTION OF SPECIFIC EMBODIMENTS

Attention is first directed to FIG., 1 which shows a prior art arrangement for converting solar radiation into utilizable energy, of the kind in which the central solar receiver is mounted on top of a solar tower.

As shown, a heliostats field 1 comprising a plurality of mirrors 2 which may for example be in the form of parabolic mirrors, reflects concentrated solar radiation to a solar receiver 3 mounted in the focal region of the heliostats field 1 on top of a tower 4. As a rule, the solar receiver 3 is associated with a secondary concentrator and with equipment for the extraction of the utilizable heat generated in the receiver or for other use of the concentrator light.

Figure 1:
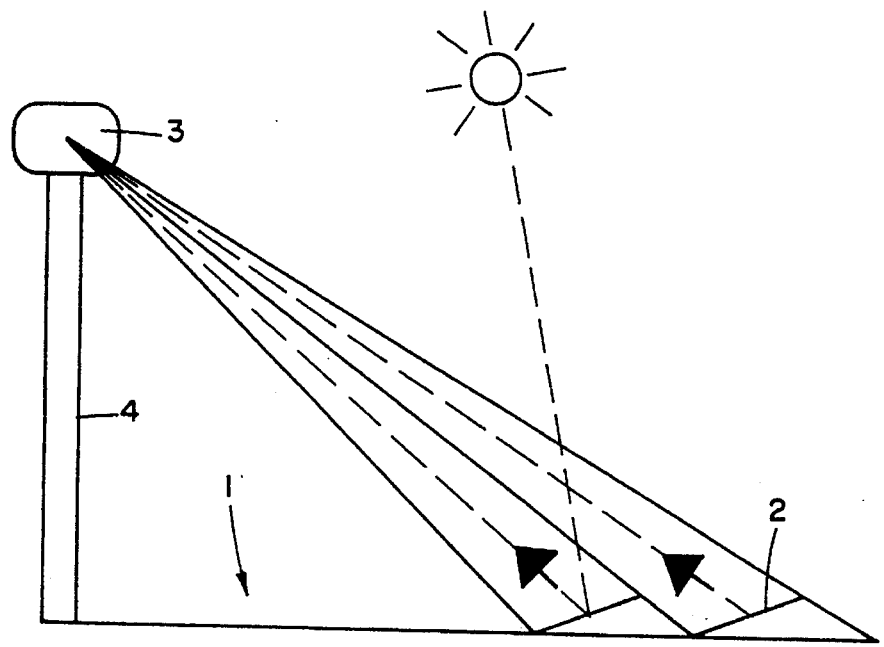
FIG. 1 is a schematic illustration of a section of a conventional solar energy plant with central solar receiver.
Figure 2:
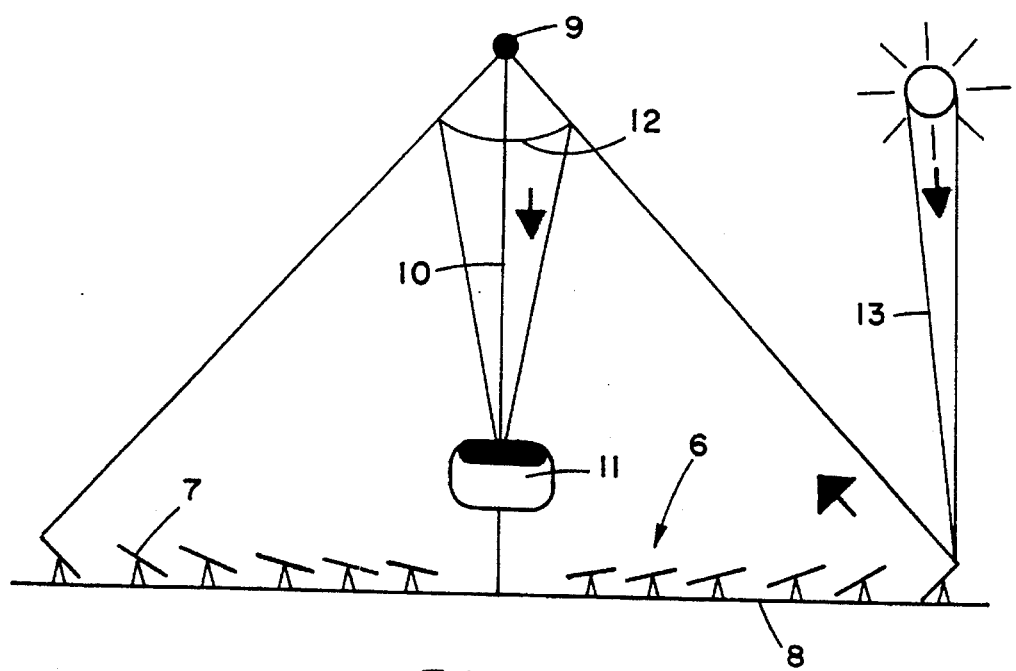
FIG. 2 is a schematic illustration of one embodiment of a plant according to the invention.

Attention is now directed to FIG. 2 which shows one embodiment of a solar plant according to the invention. As shown, a heliostats field 6 consisting of a plurality of concentrating reflectors 7 such as, for example, parabolic mirrors, is mounted on a base plane 8. The focal point of the heliostats field is indicated at 9.

A solar receiver 11 is mounted slightly above the base plane 8 underneath the focal point 9 so that its axis coincides with the axis of symmetry 10 of the plant. Above receiver 11 and somewhat underneath the focal point 9 there is mounted an additional reflector 12. Preferably, the ratio of a distance between additional reflector 12 and the focal point 9 to the focal length of the heliostats field, is from 1:5 to 1:10.

The additional reflector 12 is preferably in the form of a convex mirror, particularly a hyperbolic mirror with a diameter about 10% and an area of about 1% of the heliostats field. Alternatively, additional reflector 12 may be mounted behind the focal point 9 and be concave. The additional reflector may be made in one piece or be segmented. It may also be of the Fresnel type.

As shown, the oncoming solar radiation 13 is concentrated by the heliostats field 6 in the direction of the focal point 9 and is reflected by additional reflector 12 so as to be redirected onto the solar receiver 11.

As described later in detail, the additional reflector, according to the present invention, is in the form of a dielectric mirror designed so that its absorption of the radiation is negligible, enabling the reflector to be exposed to the highly concentrated light reflected by the heliostats field.

Figure 3:
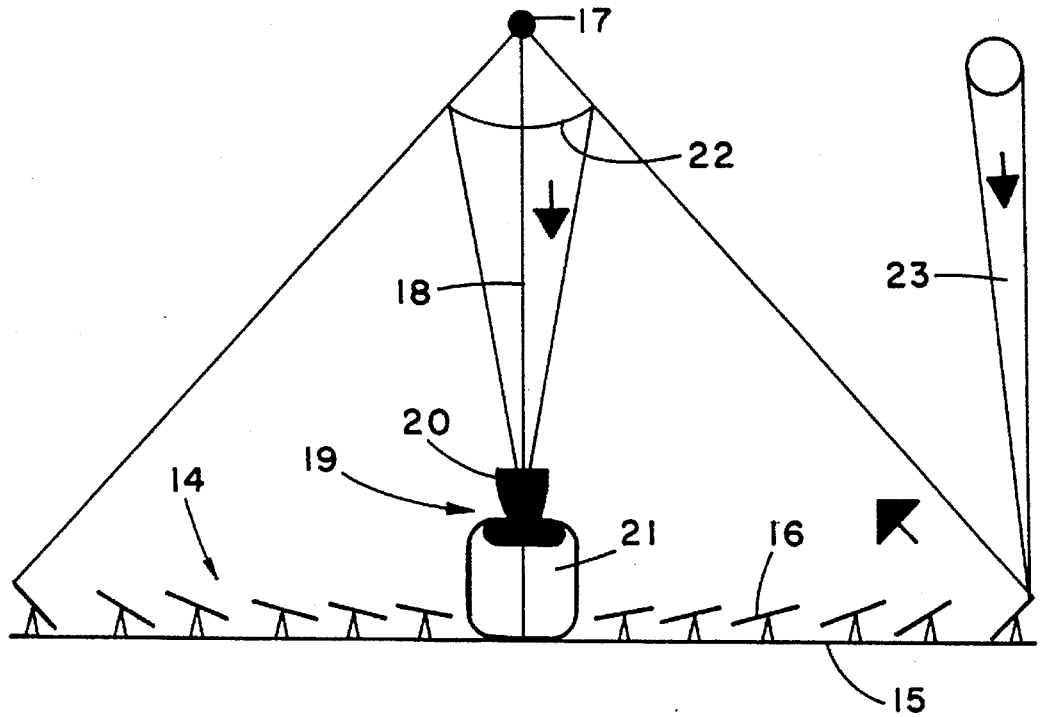
FIG. 3 is a schematic illustration of another embodiment of a plant according to the invention.

The embodiment of FIG. 3 is similar to that of FIG. 2 and it again comprises a heliostats field 14 mounted on a base plane 15 and comprising a plurality of concentrating mirrors 16, e.g. parabolic mirrors.

The heliostats field 14 has a focal point 17 located on the axis of symmetry 18.

Slightly above the base plane 15 there is located an assembly 19 comprising a secondary concentrator 20 and a solar receiver 21. Intermediary between the secondary concentrator 20 and the focal point 17 and close to the latter there is mounted an additional reflector 22 which redirects the concentrated solar radiation arriving from the heliostats field 14 onto the secondary concentrator 20 which in turn directs the further concentrated solar radiation onto the solar receiver 21. The incident solar radiation is indicated at 23.

It should be noted that the heliostats field may be installed on a base plane inclined towards the incident solar radiation so as to reduce the angle that the latter forms with a normal to the base plane. Furthermore, in case of an inclined base plane, the inclinations of the individual heliostats themselves may be decreased whereby shadowing and aberrations are reduced.

In the embodiments of FIGS. 2 and 3, the additional reflector and solar receiver and in the case of FIG. 3 also the secondary concentrator, are mounted symmetrically with respect to the heliostats field. A different embodiment in which the additional reflector and the receiver are mounted asymmetrically, is illustrated schematically in FIG. 4. As shown, a heliostats field 25 comprising a plurality of concentrating mirrors 26, e.g. of the parabolic dish type, is mounted on a base plane 27, the design of the heliostats field being such that the focal point 28 is located off center in the manner shown and in consequence the solar receiver 31 is also off center. The additional reflector 30, e.g. in form of an off-axis segment of a hyperboloid, is mounted in the manner shown off the vertical that leads from the focal point 28 to a secondary concentrator 29 and the associated solar receiver 31.

Figure 4:
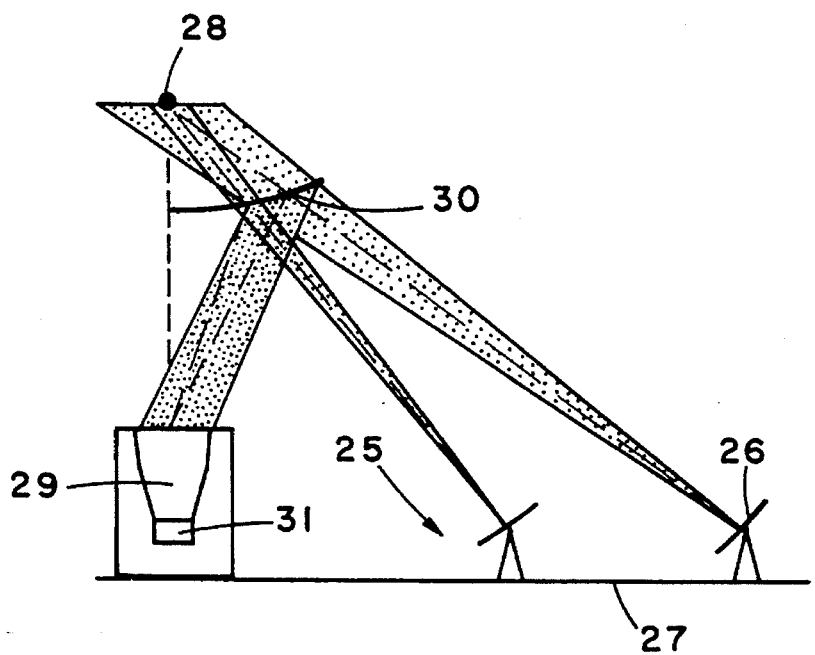
FIG. 4 is a schematic illustration of yet another embodiment of a plant according to the invention.

The asymmetric arrangement of FIG. 4 has the advantage that it enables to mount mirrors 26 of the heliostats field 25 in such a way that the mirrors' axes are oriented towards the sun and the solar radiation incidents the mirrors essentially normal to the surface. The dimensions of the structure on which the secondary concentrator 29 and the solar receiver 31 are mounted are in this case increased as compared to those in the embodiments of FIGS. 2 and 3 because of an increase of the focal distances.

By way of example, the dimensions may be about as follows:

radius of heliostats field—100 m;

focal lengths—about 100 m;

radius of reflector 30—10 m;

distance of reflector 30 from focal point 28—9 m;

distance between reflector 30 and base plane 27—66 m;

distance of secondary concentrator 29 from base plane—25 m.

The maximum size of the sun's image that would be produced by the heliostats field 25 around focal point 28 in the absence of additional reflector 30 would be 2.5 m., while the maximum size of the image actually afforded by additional reflector 30 is 5.2 m., i.e. more than double the size. By means of the secondary concentrator 29 this image is then reduced to the size of about 1 m.

If desired, the solar energy plant in accordance with the present invention may have dimensions much larger than that in the above example. Thus, the radius of the additional reflector may even be about 25 m. However, when such a large mirror is installed on the high solar tower (100 m and more) it will undoubtedly be exposed to very strong wind loads which may cause a severe sway thereof leading to significant displacements of the mirror with respect to the heliostats field. To avoid deterioration of concentration and light losses, the solar energy plant is provided with means for monitoring and measuring these displacements and for dynamic adjustment of aiming point of the heliostats so as to achieve a substantial compensation of the displacements. The monitoring means may be in the form of a laser scanner or TV imaging system.

Figure 5:
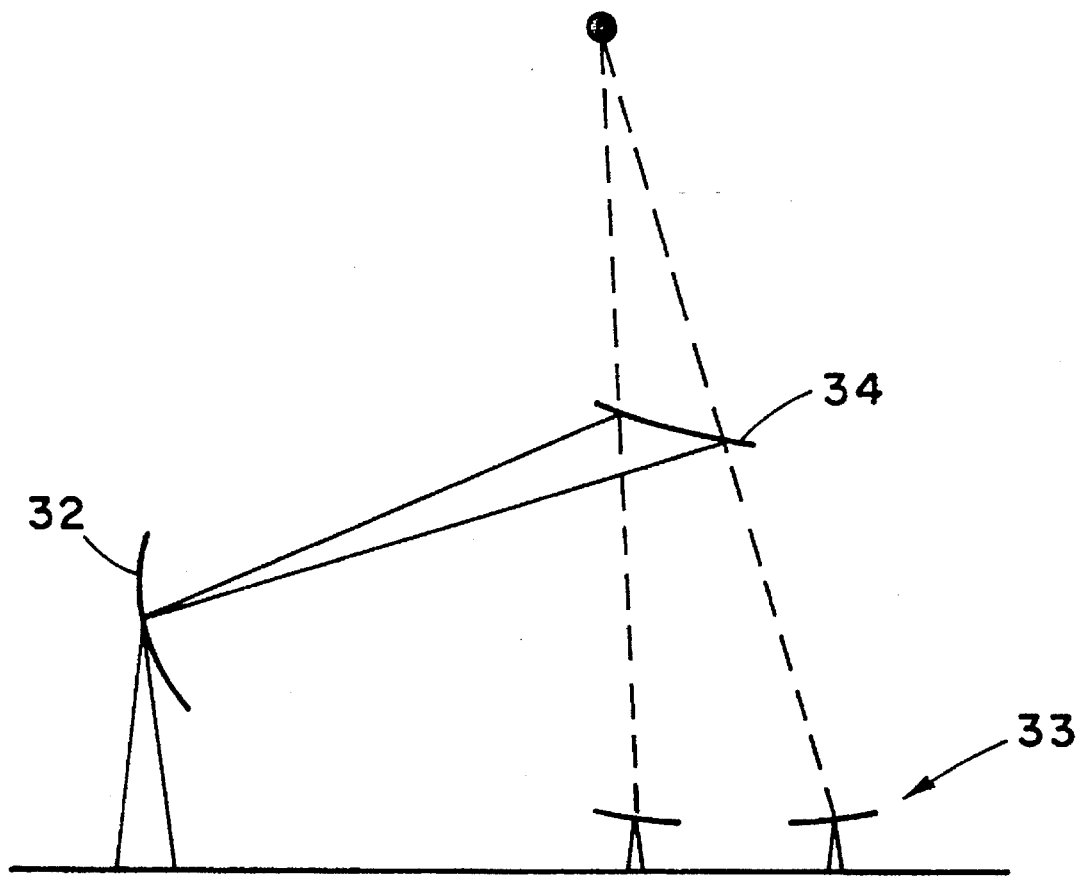
FIG. 5 is a schematic illustration of still another embodiment of a plant according to the invention.

In the embodiment of FIG. 5, the solar receiver 32 is significantly distanced from the heliostats field 33, and the additional reflector 34 is tilted so as to redirect light to said distant receiver 32. This embodiment may be particularly useful when the plant associated with the receiver 32 is to be located remote the place where the energy is used.

It has already been mentioned regarding the additional reflector, such as 12 in FIG. 2, 22 in FIG. 3, 30 in FIG. 4 and 34 in FIG. 5, that, in accordance with the present invention, it is in the form of a dielectric mirror. Generally, this mirror is designed so that the radiation which is not reflected by the reflector is transmitted therethrough. By a proper choice of material, thickness, number and sequence of the layers, which is usually done by a computer means, the reflector can be provided with a required extent of reflection and a variety of specific properties. Thus, the reflector is, preferably, in the form of a substrate made of a transparent material (such as glass or quartz) coated with a plurality of transparent thin layers constituting highly reflective interference coating. In this case, the mirror functions as a beam-splitter. Heat from radiation transmitted through the additional reflector may be extracted and utilized to warm a working fluid. In this case the part of the collected radiation which passes through the additional reflector can be used for processes utilizing low concentrated light. Alternatively, the additional reflector may be essentially reflective so that all the losses will be transmission losses or it may comprise a highly reflective metallic back coating with the reflectivity enhanced by a combination of the dielectric layers, in which case a necessity of forced cooling is avoided and natural air convection can be sufficient.

The dielectric mirror may be fitted with special features so as to be able to serve several purposes at the same time. If desired, the mirror may be made selective and designed to reflect for example, only short wavelength or alternatively only long wavelength radiation. The short wavelength radiation may be used for quantum conversion processes, and the long wavelength radiation may be used for thermal conversion processes. In cases, where light is converted directly into utilizable energy, it is preferable to utilize for such conversion only that fraction of the solar spectrum which is efficient for said conversion and remove or rather to utilize the rest of light for other purposes. Typical examples of such direct conversion are photovoltaic systems for direct production of electricity, solar pumped lasers for direct production of laser beam, photochemical reactors, etc.

To optimize conversion efficiency it is in many cases preferable to use a bandpass-type color selective additional reflector, i.e. capable of selecting out of the concentrated solar radiation specific spectral bands which may be chosen so as to increase the efficiency of the solar radiation conversion. For example, in photovoltaic systems the conversion efficiency to above 30% may be achieved by selecting out of the concentrated solar light the bandpass in a range of 0.4–0.9μ. By way of a further example, where the concentrated solar light is used for optical pumping of laser devices, it is preferable to select out of the solar spectrum a bandpass which corresponds to the absorption wavelength, which in case of a Nd:YAG laser 0.7–0.9μ.

If desired, more than one receiver may be used in the plant in accordance with the present invention. In case of the additional reflector being of the beam splitter type, an additional secondary concentrator and/or receiver may be installed at the focal point region of the heliostats field behind a beam splitter with means for converting the transmitted part of the concentrated radiation into utilizable heat, electricity, heat storage systems, etc.

Supplementary reflectors may be placed between the additional reflector and any of the receivers so as to provide a multistage beam-splitting, spectral bands selection, etc., which may be particularly useful with a large heliostats field.

It should be noted that the light distribution of the image obtained in the focal point of the system is not homogenous, having its maximum at the center of the image and being slowly reduced towards the edges. This phenomenon can be used in thermodynamic cycles where a working fluid is gradually heated from a low temperature to a maximal temperature. In this case, the secondary concentrator, such as 20 in FIG. 3 and 29 in FIG. 4, may comprise a plurality of non-imaging concentrators arranged in concentric zones. In this case, the receiver 11, 21 or 31 has a plurality of apertures or rather is formed as an assembly of a plurality of receivers, each having one aperture. Each concentrator is connected to a respective aperture. The working fluid is gradually heated by flowing from the outermost zones with the lowest temperature to the innermost zones with the highest temperature.

The invention can be used for efficient delivery of high power fluxes separately or simultaneously to various receivers such as lasers, photovoltaic systems, semiconductor devices, fluorescent devices, chemical reactors, heat exchangers, heat engines, etc.

The present invention is specifically advantageous for use with heat storage systems which, by their very nature, must be installed at ground level. In this case, the receiver of the solar energy plant is attached directly to the heat storage system avoiding any need for heat transfer arrangements.

We claim:

1. A solar energy plant for the conversion of solar radiation into utilizable energy, comprising:

a Fresnel reflector including a plurality of radiation concentrating mirrors installed on a base plane, said Fresnel reflector being in the form of a heliostats field in which said concentrating mirrors track the sun and having a focal point removed from the heliostats field by a focal length;

at least one solar receiver placed close to said base plane; and an additional reflector mounted above said heliostats field close to said focal point so that concentrated solar radiation reflected by the heliostats field is redirected onto said at least one solar receiver; and wherein said additional reflector is in the form of a dielectric mirror, whereby an overheating of the additional reflector is avoided.

2. A solar energy plant according to claim 1, characterized in that the additional reflector is in the form of a mirror having a curved shape so as to ensure that a distribution of angles of incidence of the radiation is substantially limited.

3. A solar energy plant according to claim 2, characterized in that the additional reflector is a convex mirror mounted in front of the focal point.

4. A solar energy plant according to claim 2, characterized in that the additional reflector is a concave mirror mounted behind the focal point.

5. A solar energy plant according to claim 4, characterized in that the dielectric mirror is of the beam-splitter type so that all the non-reflected radiation is transmitted.

6. A solar energy plant according to claim 5, characterized in that the dielectric mirror is highly reflective so that all the losses of the reflector are transmission losses.

7. A solar energy plant according to claim 4, characterized in that the dielectric mirror is provided with a highly reflective metallic back coating and is adapted to enhance the reflectivity of said coating.

8. A solar energy plant according to claim 7, characterized in that the dielectric mirror is fabricated so as to be color selective.

9. A solar energy plant according to claim 8, characterized in that the color selective dielectric mirror is of a bandpass type.

10. A solar energy plant according to claim 9, characterized in that the dielectric mirror is segmented.

11. A solar energy plant according to claim 10, characterized in that the dielectric mirror is of the Fresnel type.

12. A solar energy plant according to claim 11, comprising a secondary concentrator placed between said additional reflector and said at least one solar receiver.

13. A solar energy plant according to claim 12, characterized in that said secondary concentrator is of the imaging type.

14. A solar energy plant according to claim 12, characterized in that said secondary concentrator is of the non-imaging type.

15. A solar energy plant according to claim 14, characterized in that said secondary concentrator is a compound parabolic concentrator.

16. A solar energy plant according to claim 14, characterized in that said secondary concentrator is a tailored edge-ray concentrator.

17. A solar energy plant according to claim 16, characterized in that the Fresnel reflector is located in a base plane that is inclined relative to the horizontal in a fashion that reduces the angle between incident solar radiation and a normal to the base plane.

18. A solar energy plant according to claim 17, characterized in that said at least one receiver is distanced from said Fresnel reflector and said additional reflector is tilted so as to redirect radiation onto said receiver.

19. A solar energy plant according to claim 18, comprising means for extracting utilizable energy from said additional reflector.

20. A solar energy plant according to claim 19, characterized in that said at least one solar receiver is associated with a heat engine and electric generator.

21. A solar energy plant according to claim 19, characterized in that said at least one solar receiver is a light pumped laser device.

22. A solar energy plant according to claim 19, characterized in that said al least one solar receiver is a chemical reactor.

23. A solar energy plant according to claim 22, characterized in that said at least one solar receiver is a photochemical reactor.

24. A solar energy plant according to claim 19, characterized in that said at least one solar receiver is a photovoltaic system.

25. A solar energy plant according to claim 19, characterized in that said at least one solar receiver is associated with means for the extraction of utilizable heat.

26. A solar energy plant according to claim 19, characterized in that said at least one solar receiver is associated with an energy storage system.

27. A solar energy plant according to claim 19, characterized in that said at least one solar receiver is a heat storage tank.

28. A solar energy plant according to claim 27, characterized in that the ratio between the distance of the additional reflector from said focal point and the focal length of the heliostats field is within the range of from about 1:5 to about 1:10.

29. A solar energy plant according to claim 28, characterized in that the ratio between the diameter of the additional reflector and the heliostats field is about 1:10.

30. A solar energy plant according to claim 29, characterized in that it comprises at least two solar receivers.

31. A solar energy plant according to claim 30, characterized in that at least one of said solar receivers is placed in the focal region of said heliostats field.

32. A solar energy plant according to claim 31, comprising at least one supplementary reflector placed between said additional reflector and at least one of said solar receivers.

33. A solar energy plant according to claims 30, comprising at least one supplementary reflector placed between said additional reflector and at least one of said solar receivers.

34. A solar energy plant according to claim 33, characterized in that said at least one supplementary reflector is of the dielectric mirror type.

35. A solar energy plant according to claim 33, characterized in that said at least one supplementary reflector is of the beam-splitter type.

36. A solar energy plant according to claim 35, characterized in that said at least one supplementary reflector is fabricated so as to be color selective.

37. A solar energy plant according to claim 36, characterized in that said at least one supplementary color selective reflector is of the bandpass type.

38. A solar energy plant according to claim 37, characterized in that said at least one supplementary color selective reflector has different bandpasses for different solar receivers.

39. A solar energy plant according to claim 38, characterized in that said at least one receiver holds a working fluid for a withdrawal of absorbed heat and the plant comprises intermediary between said additional reflector and said receiver, a plurality of non-imaging secondary concentrators arranged in concentric zones, each secondary concentrator associated with a dedicated aperture in said receiver, whereby concentric zone of different temperature are formed inside the receiver and the working fluid is gradually heated when passing from the outermost zone with the lowest temperature to the innermost zone with the highest temperature.

40. A solar energy plant according to claim 39, characterized in that the receiver comprises a plurality of receiver units each having one aperture.

41. A solar energy plant according to claim 39, characterized in that the receiver comprises one single receiver unit with a plurality of apertures.

42. A solar energy plant according to claim 41, characterized in that the plant comprises means for monitoring a displacement of said additional reflector and means for dynamic adjustment of the heliostats so as to track the displacement of the reflector whereby any impairment of the performance of the plant in consequence of reflector displacement is avoided.

43. A solar energy plant according claim 42, characterized in that said monitoring means is a laser device.

44. A solar energy plant according claim 42, characterized in that said monitoring means is a TV imaging system.

45. A solar energy plant according to claim 1, wherein said additional reflector is disposed at an altitude at which intensive cooling of the reflector is not practical.

46. A solar energy plant for conversion of solar radiation of the kind that comprises a working fluid for the withdrawal of absorbed heat, comprising a Fresnel reflector consisting of a plurality of concentrating mirrors installed on a base plane and having a focal point above said base plane removed from the Fresnel reflector by a focal length, at least one solar receiver assembly placed close to said base plane and holding said working fluid and an additional reflector mounted above said Fresnel reflector close to said focal point whereby concentrated solar radiation reflected by the Fresnel reflector is redirected onto said at least one solar receiver assembly, characterized in that the plant comprises intermediary between said additional reflector and said at least one solar receiver, a plurality of non-imaging secondary concentrators arranged in concentric zones, each secondary concentrator associated with a dedicated aperture in said receiver assembly, whereby concentric zones of different temperature are formed inside the receiver and the working fluid is gradually heated when passing from the outermost zone with the lowest temperature to the innermost zone with the highest temperature.

47. A solar energy plant according to claim 46, characterized in that the receiver assembly comprises a plurality of receiver units each having one aperture.

48. A solar energy plant according to claim 46, characterized in that the receiver assembly comprises one single receiver unit with a plurality of apertures.

49. A solar energy plant of the kind comprising a Fresnel reflector consisting of a plurality of concentrating mirrors installed on a base plane and having a focal point above said base plane removed from the Fresnel reflector by a focal length, at least one solar receiver placed close to said base plane and an additional reflector mounted on a tower close to said focal point whereby concentrated solar radiation reflected by the Fresnel reflector is redirected onto said at least one solar receiver, characterized in that the plant comprises means for monitoring a displacement of said additional reflector, which monitoring means may be in the form of laser scanning device or TV imaging system, and means for dynamic adjustment of the heliostats so as to track the displacement of the reflector whereby any impairment of the performance of the plant in consequence of reflector displacement is avoided.

50. A solar energy plant according to claim 49, characterized in that said monitoring means is a laser scanning device.

51. A solar energy plant according to claim 48, characterized in that said monitoring means is a TV imaging system.

52. A solar energy plant for conversion of solar radiation into heat, comprising:

a Fresnel reflector including a plurality of radiation concentrating mirrors installed on a base plane and having a focal point above said base plane removed from the Fresnel reflector by a focal length;

at least one solar receiver placed close to said base plane; and an additional reflector mounted above said Fresnel reflector close to said focal point so that concentrated solar radiation reflected by the Fresnel reflector is redirected onto said at least one solar receiver;

wherein said at least one solar receiver is in the form of a heat storage system and said additional reflector comprises a dielectric mirror, whereby an overheating of the additional reflector is avoided.

* * * * *